(12) United States Patent
Weber et al.

(10) Patent No.: US 11,485,242 B2
(45) Date of Patent: Nov. 1, 2022

(54) VEHICLE CHARGING SYSTEM

(71) Applicant: Ford Global Technologies, LLC, Dearborn, MI (US)

(72) Inventors: David Charles Weber, Toledo, OH (US); Brad Alan Ignaczak, Canton, MI (US); Adil Nizam Siddiqui, Farmington Hills, MI (US); Christopher W. Bell, Livonia, MI (US); Emil G. Serban, Livonia, MI (US); Hannah Bailey, Dearborn, MI (US); Christopher Westfall, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 475 days.

(21) Appl. No.: 16/682,402

(22) Filed: Nov. 13, 2019

(65) Prior Publication Data

US 2021/0138919 A1 May 13, 2021

(51) Int. Cl.
*B60L 53/16* (2019.01)
*H01R 13/62* (2006.01)
(Continued)

(52) U.S. Cl.
CPC ............. *B60L 53/16* (2019.02); *B60L 53/35* (2019.02); *H01R 13/6205* (2013.01); *H02J 7/0042* (2013.01)

(58) Field of Classification Search
CPC ..... B60L 53/16; B60L 53/35; H01R 13/6205; H02J 7/0042
See application file for complete search history.

(56) References Cited

U.S. PATENT DOCUMENTS

| 5,909,100 A * | 6/1999 | Watanabe | B60L 53/126 |
| | | | 320/108 |
| 2012/0229085 A1* | 9/2012 | Lau | B60L 50/66 |
| | | | 320/109 |

(Continued)

FOREIGN PATENT DOCUMENTS

| CN | 104769790 B | * 6/2017 | ............. B60L 53/14 |
| DE | 102013100175 A1 | 7/2014 | |
| WO | 2019052962 A1 | 3/2019 | |

OTHER PUBLICATIONS

CN104769790B Machine Translation (Year: 2022).*

*Primary Examiner* — David V Henze-Gongola
(74) *Attorney, Agent, or Firm* — David B Kelley; Brooks Kushman P.C.

(57) ABSTRACT

A vehicle charging system includes a vehicle charge port having a first connector with one or more first magnets and a plurality of first terminals arranged in a first array. A charge station for the vehicle includes a support and a second connector attached to the support by an articulating mechanism that permits movement of the second connector relative to the support. The second connector has one or more second magnets and a plurality of second terminals arranged in a second array that matches the first array so that the first terminals are connectable to the second terminals when the first and second connectors aligned. The first and second magnets are arranged to move the second terminals, via the articulating mechanism, into alignment with first terminals when the first and second connectors are within a magnetic-coupling range.

14 Claims, 6 Drawing Sheets

(51) Int. Cl.
  *H02J 7/00* (2006.01)
  *B60L 53/35* (2019.01)

(56) References Cited

U.S. PATENT DOCUMENTS

2014/0354229 A1\* 12/2014 Zhao .................. B60L 53/37
                                              320/109
2017/0225583 A1\* 8/2017 Chai .................. B60L 53/37

\* cited by examiner

VEHICLE CHARGING SYSTEM

TECHNICAL FIELD

This disclosure relates to conductive charging systems for at least recharging a traction battery of an electrified vehicle using an external power source, and more specifically to charging systems in which the vehicle is connected to the charging system by driving the vehicle into a charge station.

BACKGROUND

Vehicles are being developed that reduce, or completely eliminate, reliance on internal-combustion engines. Electric and hybrid vehicles are one type of vehicle currently being developed for this purpose. Electric and hybrid vehicles include a traction motor that is powered by a traction battery. Electric vehicles and plug-in hybrid vehicles are configured to connect to an external power source to recharge the traction battery and/or power on-board electrical systems. The external power source powers a charge station provided at the home or at recharge stations. The vehicle includes a charge port configured to connect to the charge station. Different types of charge stations are available including conductive charging in which a plug is manual connected to the charge port by a user and inductive charging that is wireless.

SUMMARY

According to one embodiment, a vehicle charging system includes a vehicle charge port having one or more first magnets and a plurality of first terminals arranged in a first array. A charge station for the vehicle includes a base, a riser extending upwardly from the base, an articulating mechanism including a first portion supported by the riser and a second portion that is movable relative to the first portion, and a connector attached to the second portion so that the connector is movable relative to the riser. The connector has one or more associated second magnets and a plurality of second terminals that are arranged in a second array that matches the first array so that the first terminals are connectable to the second terminals when aligned. The first and second magnets are arranged such that magnetic attraction between the first and second magnets moves the connector, via the articulating mechanism, to align and magnetically couple the second terminals in physical contact with the first terminals to electrically connect the charge station to the port.

According to another embodiment, a vehicle charging system includes a vehicle charge port having a first connector with one or more first magnets and a plurality of first terminals arranged in a first array. A charge station for the vehicle includes a support and a second connector attached to the support by an articulating mechanism that permits movement of the second connector relative to the support. The second connector has one or more second magnets and a plurality of second terminals arranged in a second array that matches the first array so that the first terminals are connectable to the second terminals when the first and second connectors aligned. The first and second magnets are arranged to move the second terminals, via the articulating mechanism, into alignment with the first terminals when the first and second connectors are within a magnetic-coupling range.

According to yet another embodiment, a vehicle includes a body having a bumper and a body panel. A traction battery is electrically connected to a first charge port that is disposed on the body panel. The first charge port is configured to receive a manually installed charge plug. A second charge port is electrically connected to the battery and is disposed in the bumper so that the vehicle can be driven to dock the second port with a charge station. The second charge port has a plurality of first terminals arranged to physically connect with second terminals of the charge station and one or more magnets configured to interact with magnets of the charge station to magnetically couple the second charge port to the charge station.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
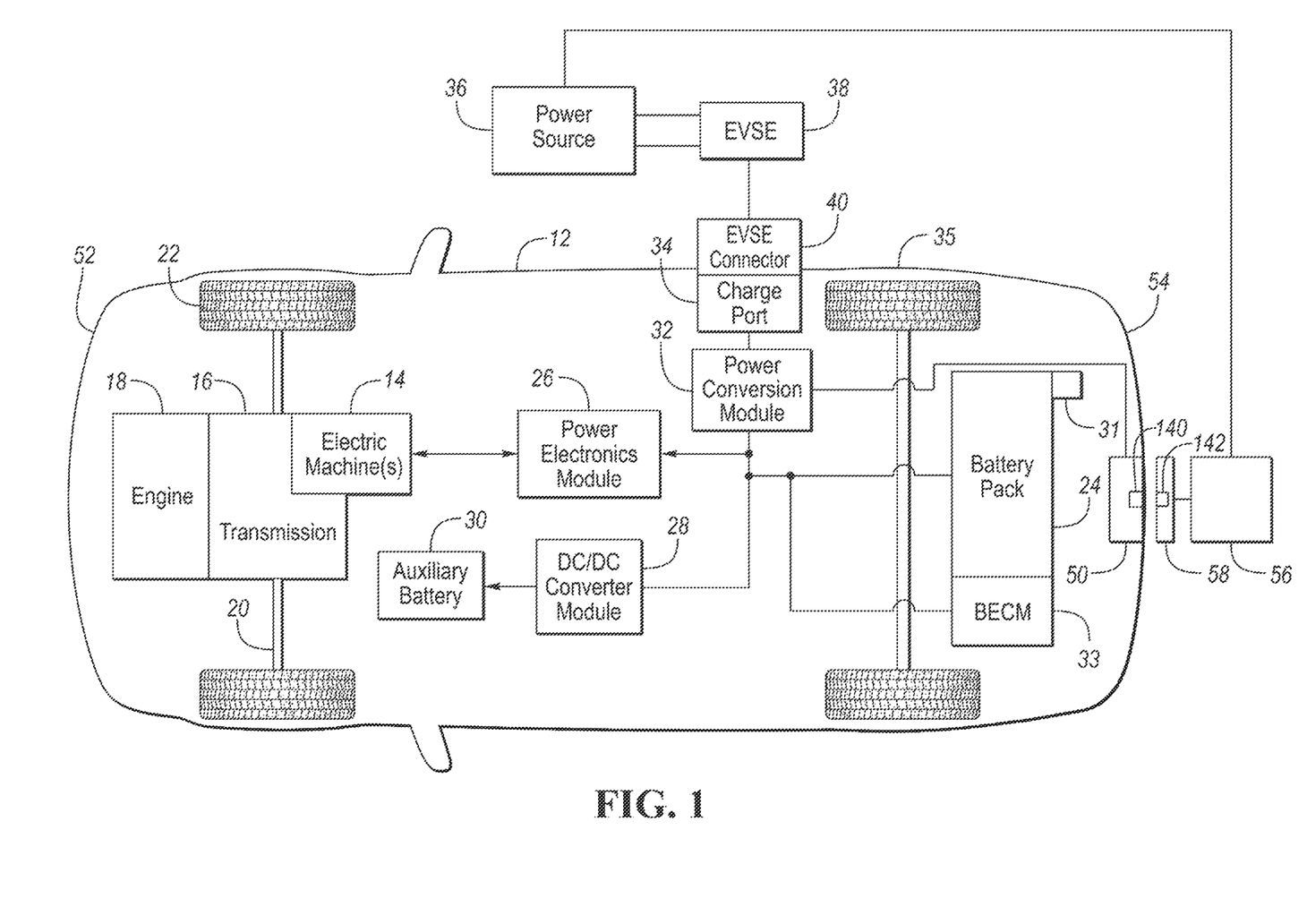
FIG. 1 is a schematic diagram of an example hybrid vehicle.

FIG. 1 depicts a schematic of a plug-in hybrid-electric vehicle (PHEV). Certain embodiments, however, may also be implemented within the context of fully electric vehicles or for providing power to vehicles with only engine 18 power, when one vehicle is paired. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the drive wheels 22. The electric machines 14 can provide propulsion and slowing capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully electric vehicle. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charge station connected to an external power source 36 such as the power grid. The external power source 36 may be electrically connected to electric vehicle supply equipment (EVSE) 38. The external power source 36 may provide DC or AC electric power to the EVSE 38. The EVSE 38 may have a charge connector 40 for plugging into a manual charge port 34 of the vehicle 12. The charge connector 40 may be according to an industrial standard such as J1772 SAE. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The EVSE may include a controller that performs diagnostics, controls the circuits in the EVSE, and communicates with other system components. The power conversion module 32 may interface with the EVSE 38 to coordinate the delivery of power to the vehicle 12. The EVSE connector (sometimes called a plug) 40 may have terminals, e.g., pins, that mate with corresponding terminals, e.g., receptacles, of the charge port 34. The charge port 34 may be provided on a body panel of the vehicle body 35. For example, the charge port 34 may be located on a front or rear quarter panel.

The vehicle 12 may include a second charge port 50 located on a bumper of the vehicle such as the front bumper 52 or the rear bumper 54 (as illustrated). The second charge port 50 is configured to electrically connect with the charge station 56. Unlike the EVSE 38 in which a user manually plugs the connector 40 into the port 34, a connector (sometimes called a plug) 58 of the charge station 56 is inserted into the port 50 by driving the vehicle into the charge station. Perfectly aligning the charge port 50 with the connector 58 is difficult so the vehicle 12 and/or the charge station 56 includes articulating means and coupling means for facilitating the connection as long as the driver is reasonably close. The second charge port 50 may also be electrically connected with the power conversion module 32 that conditions the power for the traction battery 24. The charge station 56 may be configured to provide AC power, DC power, or both. The charge station 56 employs conductive charging, meaning the connector 58 is physically and electrically connected to the charge port 50 as opposed to inductive charging that is wireless. The charge station 56 and the EVSE 38 may be the same unit, or they can be separate units as shown.

The various components discussed may have one or more controllers, such as the BECM 33, to control and monitor the operation of the components. The controller(s) may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers. The illustrated embodiment is but one of example of an electrified vehicle and others are contemplated. The controllers (modules) may be consolidated for what is shown in FIG. 1.

Figure 2:
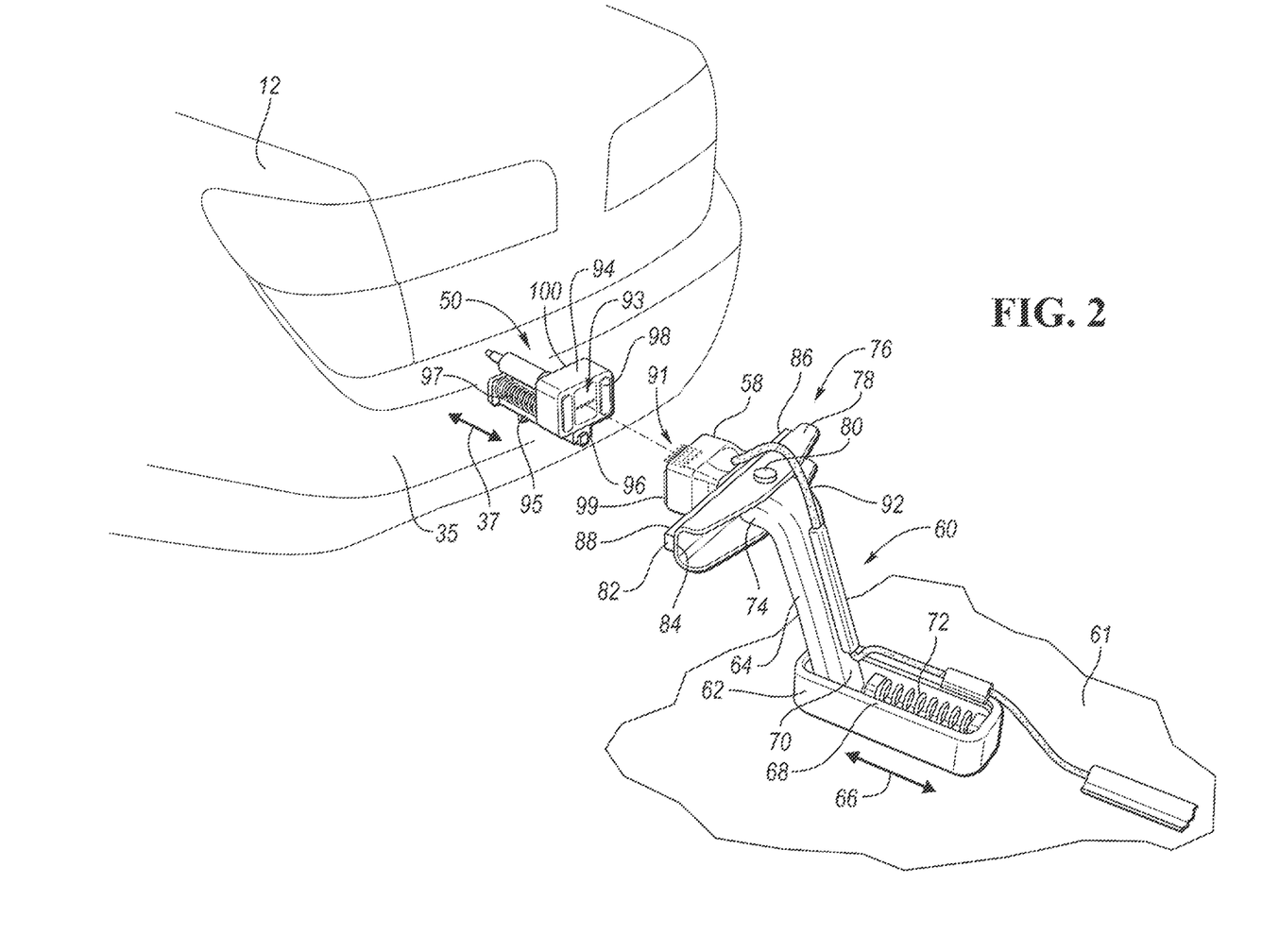
FIG. 2 is a schematic diagram of a vehicle charging system having a charge port on a vehicle and a charge station.

Referring to FIG. 2, the charge station 56 includes a dock 60 that may be placed on the floor 61 of the garage or in a lane of a commercial charge facility, also called ground plane or ground 61. The dock 60 includes a base 62 disposed on the floor. The base 62 may be rigidly attached to the floor so that the base 62 does not move when the vehicle is docked or the base may be weighted to prevent sliding on the floor 61. A riser 64 is attached to the base 62. Used herein, the terms attached, connected, etc., means directly attached or indirectly attached via one or more intermediate components unless otherwise stated. The riser 64 may be slidably attached to the base 62 so that the riser 64 is movable fore and aft as shown by arrow 66. The fore-and-aft movement provides compliance when the vehicle contacts the dock 60. The base 62 may define a guide member 68 in which a bottom end 70 of the riser 64 moves. The riser 64 may be biased to a forward position (as shown) by a resilient member 72 such as a coil spring.

The riser 64 extends upwardly in a vertical direction (either straight up or at an angle as shown) to an upper end 74. The height of the riser 64 may be adjustable to position a head 76 of the dock 60 at the appropriate height for a given vehicle. In one embodiment, the riser 64 includes telescopic portions that are slidable relative to each other to adjust the height and detent mechanisms for locking the riser in place. The riser 64 could also use a clamping mechanism or the like.

The head 76 is movable relative to the riser 64 via one or more articulating mechanisms. In the illustrated embodiment, the dock 60 includes a sliding mechanism 88 allowing the head to move left and right and a pivoting mechanism 78, 80 that allows head 76 to pivot about a substantially vertical pivot axis. Used herein, the terms "vertical" or "horizontal" are relative to the ground 61. Also used herein, "substantially vertical," or "substantially horizontal," refers to being within plus-or-minus 10 degrees of true vertical or true horizontal. The head 76 may include a bracket 78 connected to the riser 64 via a pin 80. The bracket 78 and the pin 80 cooperate to form one embodiment of the pivoting mechanism. The sliding mechanism may be a slider 82 attached to a front face 84 of the bracket 78. The slider 82 may include a guide member 86, e.g., a track, fixed to the bracket 78 and a slide 88 slidably received within the guide member 86. A friction reducing component, such as ball bearings, bushings, etc., may be employed between the guide member 86 and the slide 88. (The guide member 86 and the slide 88 may be flipped in other embodiments.) The connector 58 may be attached to the slide 88. The connector 58 is the component that connects with the charge port 50 of the vehicle. The connector 58 can be moved left and right via the sliding mechanism 86, 88 and pivot via the pivoting mechanism 78, 80. This facilitates aligning the connector 90 with the charge port 50. The connector 58 includes one or more terminals 91 that are electrically connected with a wiring harness 92 connected between the connector 58 and the electronics of the charge station 56.

The on-vehicle charge port 50 includes another mating connector 94 that electrically connects to the connector 58. The connectors 58, 94 include mating terminals that physically engage to electrically connect the charge port 50 and the charge station 56. The terminals 91 of the connector 58 may be one of pins and receptacles and the terminals 93 of the connector 94 may be the other mating design of pins and receptacles. The connector 94 may be movably connected to the vehicle body 35. For example, the connector 94 may be slidable in a longitudinal direction 37 of the vehicle 12. The charge port 50 may include a track 95 fixed relative to the vehicle body 35 and a slide 96 that is attached to the connector 94. The slide 96 is movable along the track 95 allowing the connector 94 to move in the longitudinal direction 37. The connector 94 may be biased towards the exterior of the vehicle body 35 with a resilient member 97 such as a coil spring. The sliding mechanism of the charge port 50 cooperates with the articulating mechanism of the base 62 to reduce the impact between the charge port 50 and the dock 60 when the vehicle 12 is connected to the charge station 56 and it allows for a short time delay in braking the vehicle 12 motion when docking/pairing.

The connectors 58 and 94 may be coupled magnetically. The charge port 50 may include one or more magnets 98 arranged on or near the connector 94, and the connector 58 also includes one or more associated magnets 99 arranged on or near the connector 90. In the illustrated embodiment, each connector includes a pair of magnets. The magnets are arranged so that the opposing magnet pairs of the connectors 90 and 94 have opposite polarities to magnetically attracted the connectors 90, 94 together. The connectors 90 and 94 may be according to a standard, such a J1772 SAE, or may be unique. The connector 94 has a wire harness that transmits the power from the charging port 50 to the conversion module 32 as shown in FIG. 1.

Figure 3:
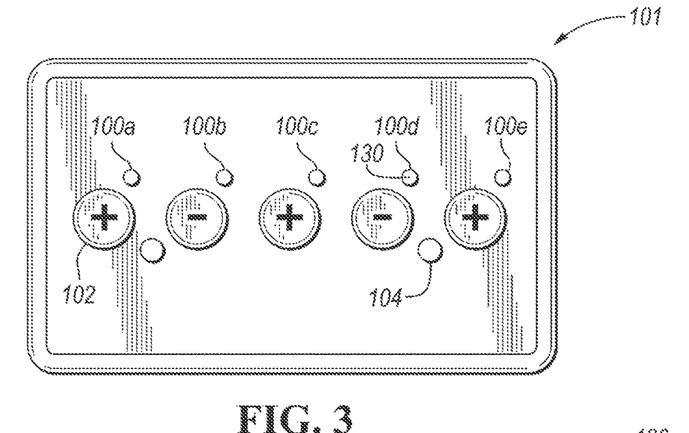
FIG. 3 is a front view of a connector of a charge station.

Referring to FIG. 3, a unique connector 101 is shown. The connector 101 may be attached to a dock that is the same or similar to the dock 60. The connector 101 includes terminals, such as five terminals 100a-100e, arranged in a first array (pattern). The first array may be linear and oriented in the left-to-right direction. The terminals 100 may be equally spaced along the array. For example, the terminals may be spaced at 1.6 inch centers. The connector 101 may include a different number of terminals, such as seven terminals, in other embodiments. The terminals 100 may be pins or receptacles. In the illustrated embodiment, the terminals 100 are pins projecting outwardly from the connector 101. The pins 100 may be spring-loaded as will be discussed in more detail below. The terminals 100 are connected to a wiring harness that may be the same or similar to wiring harness 92.

The connector 101 also includes one or more magnets 102 either disposed on the connector (as shown) or in close proximity. In the illustrated embodiment, the connector 101 includes five magnets interleaved with the terminals 100. While the connector 101 includes an equal number of magnets 102 and terminals 100, this is not required in all embodiments. The magnets 102 are arranged in an array (pattern), which in the illustrated embodiment is also linear in the left-to-right direction. The magnets 102 alternate polarity along the length of the array. For example, the magnets alternate positive and negative from left to right. (The polarity of each magnet refers to the pole that is facing outwardly from the connector. For example, magnet 100a has the positive pole facing outwardly and the negative pole facing inwardly towards the bracket; thus, magnet 100a has a positive polarity.) The magnets 102 may be equally spaced in the array, e.g., at 1.6 inch centers. The connector 101 may also include one or more stoppers 104 that prevent the magnets of the connector 101 from contacting the magnets of the port 50. This reduces the chances of damaging one or more of the magnets and facilitates the de-coupling of the connectors. The stoppers 104 may also be a non-magnetic film (e.g., plastic) over the magnets 102, or the magnets may be within the connector 90.

The magnets may be disk magnets, bar magnets, or the like. Each magnet may have a pull strength of 3 to 12 pounds depending upon the attributes of the connectors. In one embodiment of disk magnets, the magnets may have a diameter of between 0.8 and 2 inches and may have a thickness between 0.3 and 0.8 inches. In one embodiment of bar magnets, the magnets may have a length between 1.75 and 3 inches and a width between 0.25 and 0.5 inches. These dimensions are merely examples and are not limiting.

Figure 4:
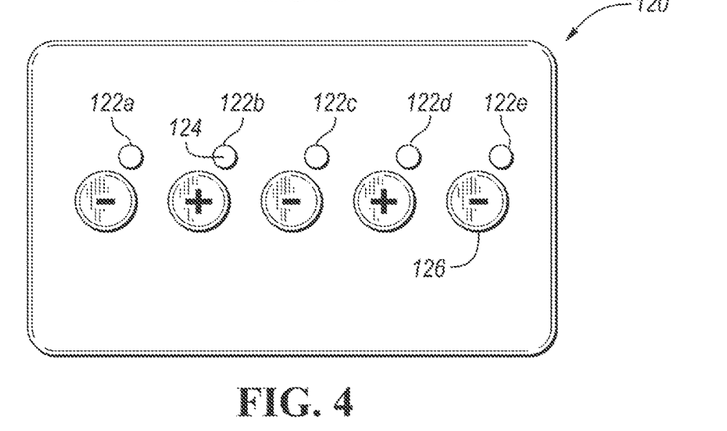
FIG. 4 is a front view of a connector of vehicle charge port that is associated with the connector of FIG. 3.

FIG. 4 illustrates a charge port connector 120 configured to mate with the connector 101. The connector 120 includes terminals, such as five terminals 122a-122e, arranged in a second array (pattern). The second array may be linear and oriented in the left-to-right direction. The terminals 122 may be equally spaced along the array. For example, the terminals may be spaced at 1.6 inch centers. The second array matches the first array so that the terminals 100 can mate with the terminals 122 when the vehicle 12 is docked. The connector 120 may include a different number of terminals, such as seven terminals, in other embodiments. The terminals 122 may be pins or receptacles. In the illustrated embodiment, the terminals 122 are receptacles taking the form of flat contact pads, but may be sockets in other embodiments. The terminals 122 are electrically connected to the power conversion module 32. The contact pads have flat faces 124 configured to physical contact distal ends of the pins 100. The distal ends may be a flat face 130. The surface area of each face 124 may be larger than the surface area of the corresponding faces 130 to ensure good contact over a larger alignment window. According to one embodiment, the faces 124 are at least twice as large as the faces 130. The contact pads may be circular, elongated, or any other shape.

The connector 120 also includes one or more magnets 126 on or near the connector. In the illustrated embodiment, the connector 120 includes five magnets interleaved with the terminals 122. While the connector 120 includes an equal number of magnets 126 and terminals 122, this is not required in all embodiments. The magnets 126 are arranged in an array (pattern), which in the illustrated embodiment is also linear in the left-to-right direction. The array of magnets 126 may match the array of magnets 102 so that the magnets oppose each other when the connectors 101, 120 are aligned. The magnets 126 alternate polarity along the length of the array. For example, the magnets alternate negative and position from left to right. This is opposite of the magnets 102 so that positive magnets oppose negative magnets when properly aligned, i.e., when FIG. 3 and FIG. 4 are centered. The magnets 126 may be equally spaced in the array, e.g., at 1.6 inch centers. The magnets may be disk magnets, bar magnets, or the like as described above with regards to the connector 101. The type and shape of magnets 126 may be the same as the magnets 102. Each of the magnets 126 may be the same or one or more different types and shapes may be used depending on the design.

During docking, the magnets 102 and 126 cooperate to automatically adjust the position of the connector 101, via the one or more articulating mechanisms, to align the connectors 101 and 120 so that the terminals 102 and 122 physically connect. For example, if the vehicle port is misaligned to the left, magnets of the same polarity repel each other while magnets of opposite polarity attract each other causing the articulating member, e.g., the slide 88, to move to the right and align the connectors 101, 120. As the magnets align, the pulling force increases causing the connectors to couple as the vehicle 12 moves forward. The closer the connectors become, the higher the aligning forces. The same is true for the other adjustment axes of the dock 60. For example, if the vehicle is not perpendicular to the head, the magnetic coupling operates to pivot the head 76 about the second articulating mechanism to square up the connectors.

If the vehicle is substantially misaligned, it is possible for the incorrect positive and negative magnet pairs to be aligned with each other and connect the wrong terminals together. Thus, the vehicle may be programmed to inform the driver of an incorrect coupling via the module 32 and prevent the flow of electricity. For example, the terminals 100a, 122a, 100e, and 122e, which are located on the ends of the arrays, are part of a test circuit. If the vehicle 12 incorrectly docks, one or more of these terminals will not be electrically connected preventing power flow between the charge station 56 and the charge port 50 using the circuitry in the charge station. The vehicle 12 may be programmed to issue a warning on the instrument panel of the incorrect alignment so that the driver may undock and try again. The warning may inform the driver of the direction of misalignment to aid in the redocking. Further, cameras may be used to assist the driver of the vehicle 12 to center up his/her approach to the docking connector 60.

Referring back to FIG. 1, one or more of the connectors may include a latching feature 140 that holds the connector 58 to the port 50. In addition to holding the connectors together, the latching feature 140 may also be configured to draw the connector together to ensure good pin contact. One example latching feature 140 is a screw mechanism that that is powered by a servo motor. One connector includes the screw mechanism and the other connector includes features 142 for engaging with the screw mechanism. Rotation of the screw mechanism in a first direction draws the connectors together and rotation in the opposite direction moves the connectors apart.

Figure 5:
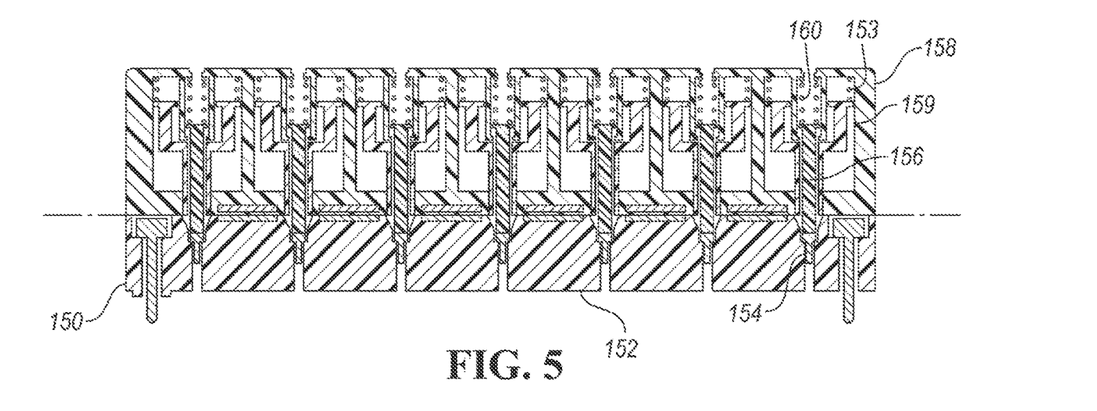
FIG. 5 is a top cross-sectional view of mating connectors according to an alternative embodiment.

Referring to FIG. 5, a seven-pin design is shown in top cross-section. The connector 150 of the vehicle port 152 includes seven terminals in the form of receptacles 154 configured to receive the seven pins 156 of the charge station connector 158. (This can be flipped in other embodiments.) The pins 156 are movable between an extended position and a retracted position. The pins 156 are biased towards the extended position by resilient members such as springs 160. The springs 160 are compressible to allow pins 156 to retract as they contact the flat receptacles 154. The springs 160 allow movement of the pins 156 to account for angular misalignment of the connectors 150 and 158 and for variation in the depth of the receptacles 154 due to manufacturing tolerances. The pins 156 may also have a non-conductive sleeve 159 to cover the terminals 156 when unmated. Springs 153 by be used to retract the sleeve 159.

Figure 6:
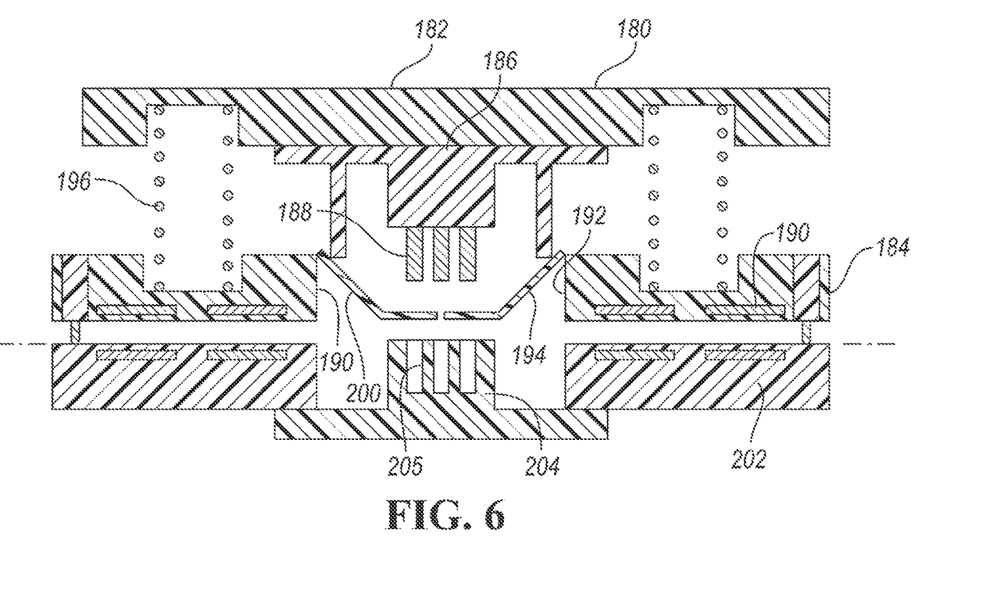
FIG. 6 is a top cross-sectional view of a charging system of alternative embodiment shown in a first position.
Figure 7:
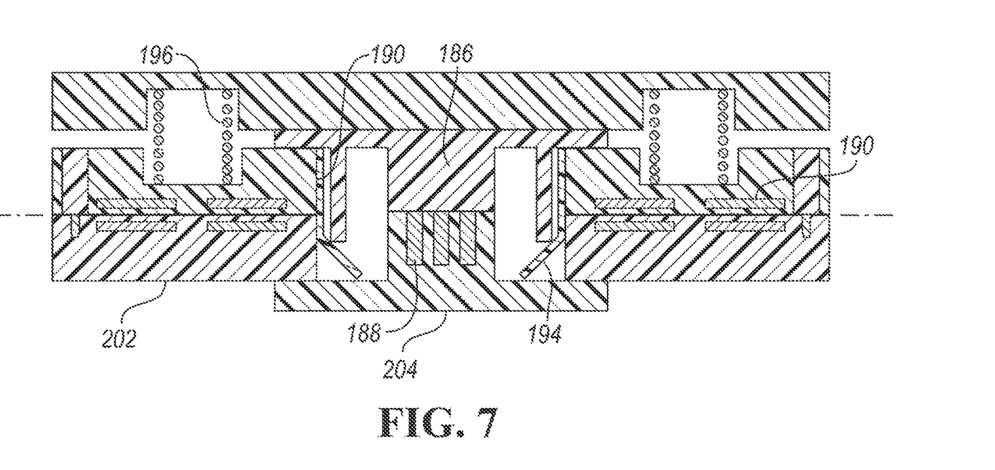
FIG. 7 is a top cross-sectional view of the charging system of FIG. 6 in a second position.

FIGS. 6 and 7 illustrate and example embodiment of a charge port 180 with a cover that automatically opens upon docking. The charge port 180 includes a stationary base 182 and a movable outer cover 184. A connector 186 is supported by the base 182. In the illustrated embodiment, the connector 186 includes terminal pins 188. The magnets 190 are disposed in the outer cover 184. The cover 184 includes an opening 192 and a door 194 that seals the opening 192 when in the closed position of FIG. 6. The cover 184 is movable in the longitudinal direction of the vehicle 12 between an unmated position (FIG. 6) and a mated position (FIG. 7). The cover 184 is biased to the extended, unmated position by one or more resilient members 196 such as coil springs. The door 194 may include two panels 200 that are actuated by movement of the cover 184. The panels 200 come together to seal the opening 192 when the cover 184 is in the extended, unmated position and open as the cover 194 is compressed by arms on the connector 186 as the outer cover 184 is compressed closer to the base 182.

The cover 184 is configured to engage with the head 202 of the charge station. The head 202 includes a connector 204 configured to engage with the connector 186 to electrically connect the charge station to the vehicle. In the illustrated embodiment, the connector 204 includes receptacles, e.g., sockets 205, that receive the pins 188. The cover 184 compresses the springs 196 as the vehicle is driven into the charge station. This causes the hinged door 194 to open so that the connectors 186 and 204 can connect with each other. Upon undocking, the door 194 closes as the cover 184 moves towards the extended position. The door 194 may be made of a resilient material (as shown) or it may have hinges and a closing spring (not shown).

Figure 8:
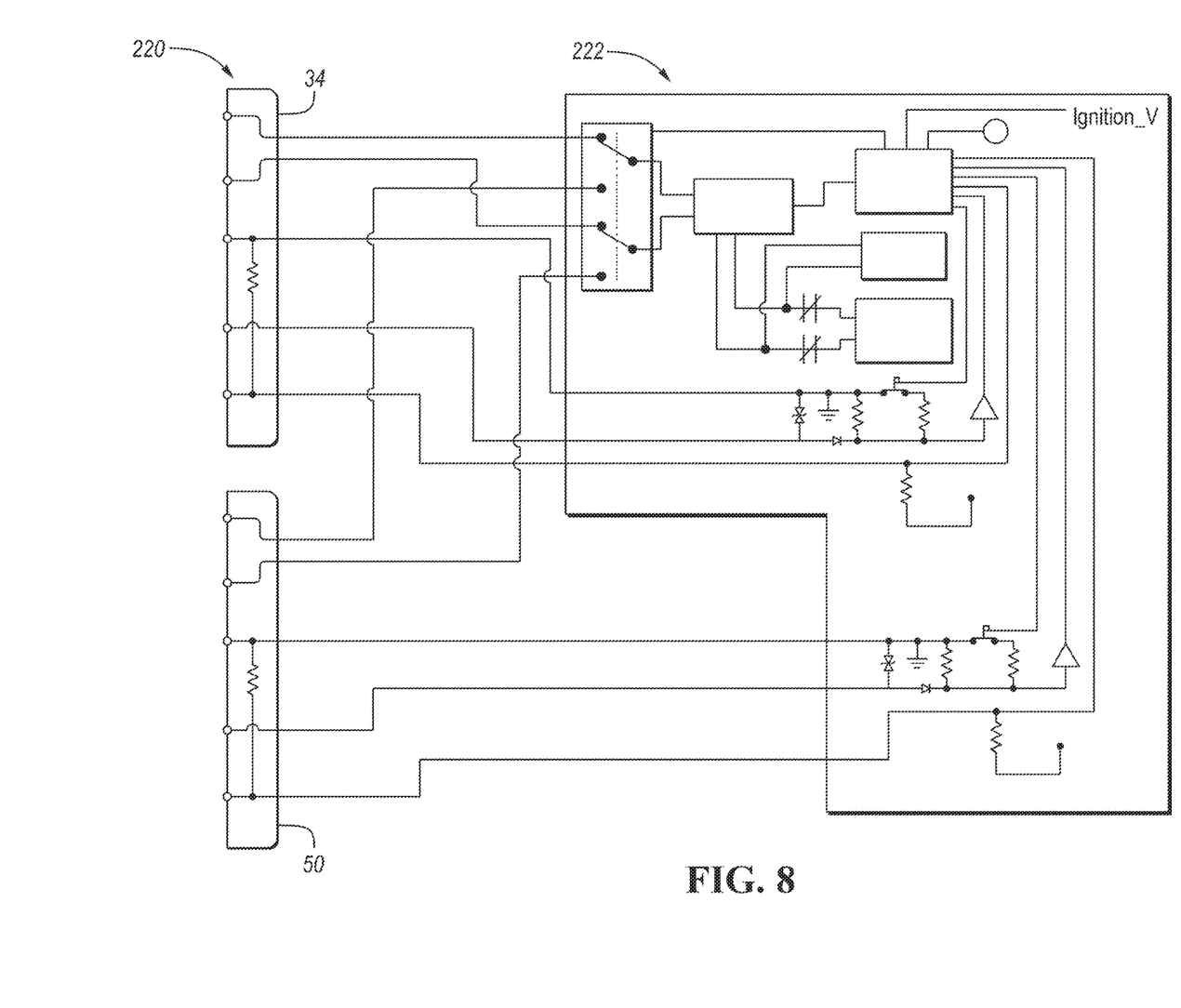
FIG. 8 is a circuit diagram of the vehicle related to the charging system.

FIG. 8 illustrates one example circuit 220 for the vehicle 12 having both the manual charge port 34 and the docking charge port 50. This example is for a five-pin design. The circuit 220 is designed to allow only one of the charge ports 34 or 50 to be used at a time. The circuit 220 may include a Double Pole Double Throw (DPDT) relay 222 or similar components, controlled by the EVSE controller, to connect the high voltage charging circuit to either the port 34 or the port 50. Similarly, a system of relays or similar components could be added between the redundant magnetic coupler contacts (306a, b, c, d) and the EVSE, such that the EVSE controller can enable power only to the magnetic coupler contacts that are physically connected to the vehicle, ensuring that unused contacts are not capable of making unintended contact with other objects.

Figure 9:
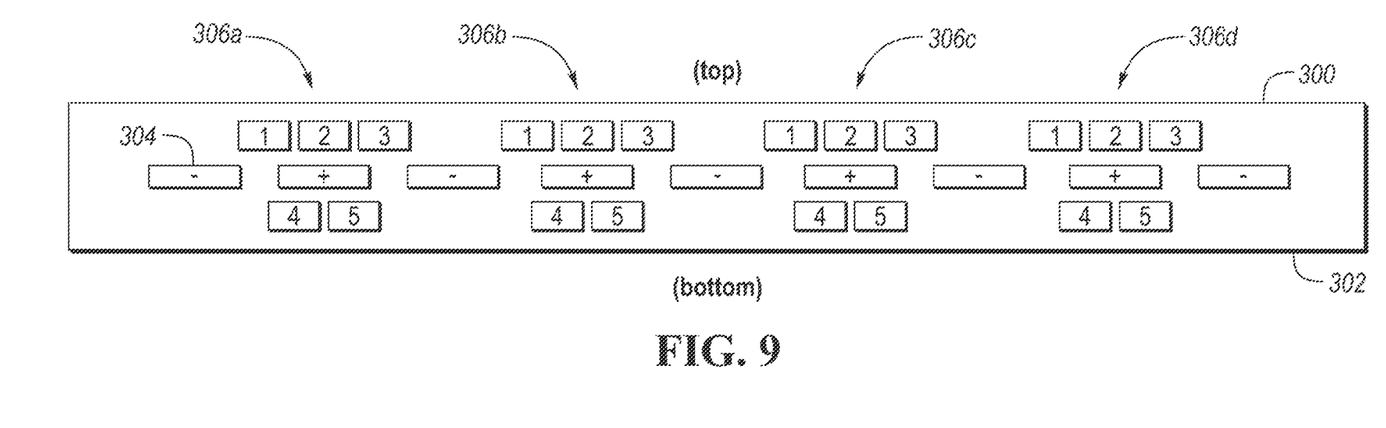
FIG. 9 is a front view of a connector of a charge station according to another embodiment.
Figure 10:
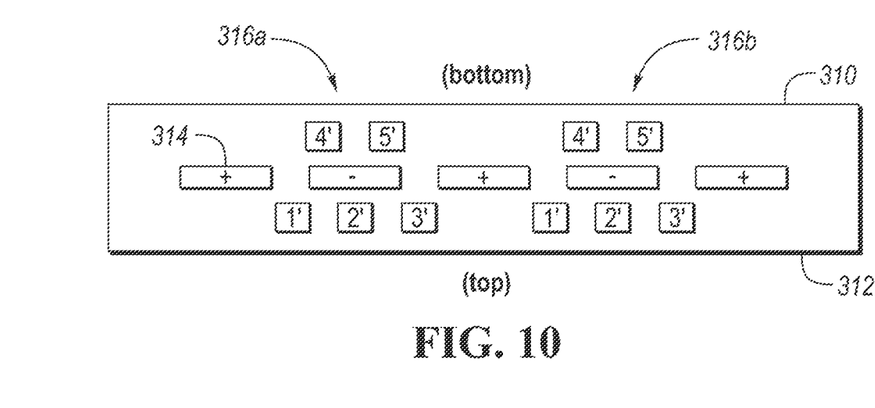
FIG. 10 is a front view of a connector of vehicle charge port that is associated with the connector of FIG. 9.

FIGS. 9 and 10 illustrate an alternative head design and vehicle port that include redundant sets of terminals to further increase the chances of properly docking the vehicle to the charge station. In the illustrated embodiment, the connector 300 of the station includes a front face 302 having the terminals and magnets disposed thereon. The connector 300 may be part of a head assembly that includes one or more articulating mechanisms as described above and the station associated with the connector 300 may also be as described above. In another embodiment, the connector 300 may rigidly attached to the station. The connector 300 may include a linear arrangement of magnets 304 extending in the lengthwise direction of the connector 300. Other arrangements of magnets may also be used. The connector 300 may include nine bar magnets as shown, or may include a different number or different type, e.g., disk, of magnets. The magnets 304 may be arranged so that the poles of the magnets alternate in the lengthwise direction. The bar magnet may be special bar magnets in which the poles are on the faces as opposed to the ends like a typical bar magnet. The connector 300 includes four sets of terminals 306a, 306b, 306c, and 306d arranged linearly in the lengthwise direction of the connector and each independently capable of electrically connecting the station. In the illustrated embodiment, each set of terminals 306 includes five terminals. The five terminals may be the same type as the five terminals described above. In other embodiments, each set of terminals may include seven terminals as described above or other arrangement. Each set 306 includes the same five types of terminals arranged in the same pattern, and the same terminals from each set 306 are electrically tied together, i.e., shorted to one another.

On the vehicle 12, the charge port 50 includes a connector 310 having a face 312 with terminals and magnets disposed thereon. The connector 310 is shorter (in the length direction) than the connector 300 and includes less magnets and less sets of terminals. The connector 310 includes an array of magnets 314, such as the five illustrated bar magnets, arranged to mate with the magnets 304 of the connector 300. The magnets 314 may be the same magnets as the magnets 304 and the spacing between these magnets may match so that when the connector 310 is properly aligned with the connector 300 some of the magnets 314 are opposite some of the magnets 304.

The connector 310 may include two sets of terminals 316a and 316b. The sets 316 match the sets 306 so that they can electronically connect to each other. That is, the sets 316 includes the same number of terminals that are arranged in the same pattern of the sets 306. In the illustrated embodiment, the each set 316 includes five terminals. The same terminals of the sets 316 are also electrically tied together, i.e., shorted to one another. The spacing between the sets 316 are equal to spacing of the sets 306.

For ease of description, each set 306 is described as having terminals 1 through 5 and each set 316 is described as having terminals 1' through 5'. A valid connection between a set 306 and a set 316 occurs when terminals 1 and 1' connect, terminals 2 and 2' connect, terminals 3 and 3' connect, terminals 4 and 4' connect, and terminals 5 and 5' connect. A valid connection between the charge station and the vehicle occurs when at least one set 306 validly connects to at least one set 316.

When the connectors 300 and 310 are center aligned, the magnets 314 are opposite the five middle magnets of the connector 300, set 306b is connected to set 316a, and set 306c is connected to set 316b. (As discussed above, the magnets and the articulating mechanism self-align the connects if close.) If the connector 310 is slightly misaligned left, then set 306a is connected to set 316a, and set 306b is connected to set 316b. If the connector 310 is further misaligned left, then set 306a is connected to set 316b. Similar is true for misalignment to the right. Thus, the illustrated embodiment proves five alignment positions for achieving a valid connection. These five alignment positions in conjunction with the articulating mechanisms increases the amount of permissible error for the driver making it easier to dock the vehicle at the charge station.

As discussed above, the terminals may be pads, receptacles, pins, and the like. In the illustrated embodiment, the terminals of the connector 300 are pads that are configured to physically engage with pins of the connector 310. The terminal pins of the connector 310 may be spring-loaded as discussed above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charging system comprising:
   a vehicle charge port including one or more first magnets, and a plurality of first terminals arranged in a first array; and
   a charge station including:
      a base,
      a riser extending upwardly from the base,
      a bracket pivotally connected to the riser,
      a sliding mechanism supported by the bracket such that the sliding mechanism is pivotable relative to the riser, the sliding mechanism including a guide member and a slider received in the guide member and configured to slide relative to the guide member, wherein one of the guide member or the slider is attached to the bracket, and
      a connector attached to the sliding mechanism so that the connector is slidable relative to the riser via the slider and pivotal relative to the riser via the bracket, the connector having one or more associated second magnets and a plurality of second terminals that are arranged in a second array that matches the first array so that the first terminals are connectable to the second terminals when aligned, wherein the first and second magnets are arranged such that magnetic attraction between the first and second magnets moves the connector, via the sliding mechanism and the pivotally connected bracket, to align and magnetically couple the second terminals in physical contact with the first terminals to electrically connect the charge station to the port.

2. The vehicle charging system of claim 1, wherein the guide member is oriented substantially horizontal allowing the connector to move left and right relative to the vehicle charge port to align the first and second terminals.

3. The vehicle charging system of claim 1, wherein the vehicle charger further includes a second articulating mechanism connected between the riser and the base and configured to allow the riser to slide relative to the base.

4. The vehicle charging system of claim 1, wherein the bracket is pivotally attached to the riser by a pin that defines a substantially vertical pivot axis.

5. The vehicle charging system of claim 1, wherein the connector includes a latching feature configured to retain the connector to the charge port.

6. The vehicle charging system of claim 1, wherein the port includes a plurality of the first magnets, and the connector includes a plurality of the second magnets, wherein an amount of first magnets is equal to an amount of the second magnets.

7. The vehicle charging system 6, wherein the first magnets are arranged in a first linear array with polarity of the first magnets alternating along a length of the first linear array, and the second magnets are arranged in a second linear array with polarity of the second magnets alternating along a length of the second linear array.

8. The vehicle charging system 6, wherein the amount of first magnets is equal to an amount of first terminals, and the amount of second magnets is equal to an amount of second terminals.

9. The vehicle charging system 1, wherein the first terminals are contact pads and the second terminals are pins.

10. The vehicle charging system 9, wherein a surface area of each contact pad is larger than a surface area of a distal end of a corresponding one of the pins.

11. The vehicle charging system 9, wherein the pins are slidably supported in the connector and are movable between an extended position and a retracted position, wherein the pins are biased to the extended position.

12. A vehicle charging system comprising:
    a vehicle charge port including one or more first magnets, and a plurality of first terminals arranged in a first array; and
    a charge station including:
       a base,
       a riser extending upwardly from the base,
       an articulating mechanism including a first portion supported by the riser and a second portion that is movable relative to the first portion, and
    a connector attached to the second portion so that the connector is movable relative to the riser, the connector having one or more associated second magnets and a plurality of second terminals that are arranged in a second array that matches the first array so that the first terminals are connectable to the second terminals when aligned, wherein the first and second magnets are arranged such that magnetic attraction between the first and second magnets moves the connector, via the articulating mechanism, to align and magnetically couple the second terminals in physical contact with the first terminals to electrically connect the charge station to the port, wherein the connector further has a plurality of third terminals arranged in a third array that matches the first array so that the first terminals are connectable to third terminals, wherein the connector is connectable to the port by electrically connecting the first and second terminals when in a first relative alignment and by electrically connecting the first and third terminals when in a second relative alignment.

13. A vehicle charging system comprising:
    a vehicle charge port including a first connector having one or more first magnets and a plurality of first terminals arranged in a first array; and
    a charge station including:
       a support, and
       a second connector attached to the support by an articulating mechanism that permits movement of the second connector relative to the support, the second connector having one or more second magnets and a plurality of second terminals arranged in a second array that matches the first array so that the first terminals are connectable to the second terminals when the first and second connectors aligned, wherein the first and second magnets are arranged to move the second terminals, via the articulating mechanism, into alignment with first terminals when the first and second connectors are within a magnetic-coupling range, wherein the second connector includes a plurality of third terminals arranged in a third array that matches the first array so that the third terminals are connectable to the first terminals, wherein the second connector is connectable to the first connector by electrically connecting the first and second terminals when in a first relative alignment and by electrically connecting the first and third terminals when in a second relative alignment.

14. The vehicle of charging system of claim 13, wherein the articulating mechanism is a slide.

\* \* \* \* \*